Patented Jan. 7, 1930

1,742,487

UNITED STATES PATENT OFFICE

JOSEPH KENT SMITH, OF DETROIT, MICHIGAN, ASSIGNOR TO GRANULAR IRON COMPANY, A CORPORATION OF MICHIGAN

METHOD OF MANUFACTURING STEEL

No Drawing.   Application filed February 11, 1928.   Serial No. 253,785.

This invention relates to an improved method of manufacturing steel, the distinctive feature of which is the "converting" of a furnace charge in which the iron bearing material is substantially a 100 percent charge of solid produced iron. That is to say, the metal part of the charge is made up wholly of iron which has been reduced by direct action with the carbonaceous material without passing the same through a melting stage. While I am not limited thereto, I prefer to make up the charge with solid produced iron which has been agglomerated from relatively finer granules to larger relatively dense lumps; in many cases the charge will consist entirely of briquettes made of such solid produced iron. In carrying out the process I cover the charge with a protective layer of material adapted to inhibit oxidation of charge by the gaseous flame passed through the furnace. Suitable shielding materials or protective substances will be referred to in detail hereinafter.

In a co-pending application Serial No. 1,555 filed January 10, 1925, I have described a method including the step of supplying the charge of solid produced iron to an open hearth furnace and covering such charge with a protective agent such as pig iron, ferro-silicon or the like so as to render the oxidizing influence of the furnace gases ineffective on the solid produced iron. The present application is an improvement over the method defined in the former application. In the method of my prior application referred to, the protecting of the surface of a charge of solid produced iron on the gas-fired open hearth furnace by the utilization of pig iron or ferro-silicon or the like prevents the fullest utilization of the inherent superior qualtities of the solid produced iron used as a base. This is because of the fact that the pig iron, ferro-silicon, etc. used as a shield naturally enters the bath and, therefore, the final or resulting steel product is endowed with its proportion of those characteristics inherited from the pig iron or other shielding material. Moreover, it will be realized by those skilled in the art that in certain locations or under certain circumstances pig iron may be temporarily or permanently unavailable for use as a shielding material. In some locations also it will be appreciated that it will be prohibitive to transport pig iron for the purpose of using it as a shielding material.

Attempts have been made at various times in the art, to accomplish the melting of steel scrap, wrought iron, or the like in such an oxidizing atmosphere by covering the face of the charge with powdered coke, charcoal, coal or the like in order to carburize and, therefore, render more readily fusible the top of the charge to be melted, but such attempts rarely met with success as the furnace gases readily burned or swept away the carbonaceous material leaving some unmelted material bare; if the proportion of the covering carbon layer were so relatively greatly increased as to obviate this, heat conduction and melting were extremely slow and so much trouble arose in other respects with the contents of the furnace as to make the scheme impracticable.

If the combustion gases of the steel furnace can be kept non-oxidizing or even moderately non-oxidizing to hot iron, in other words if the time temperature melting curve can be kept divergent from the time temperature oxidization curve instead of their crossing each other as they must do in any attempt to melt iron in an atmosphere strongly oxidizing to it, the melting of briquetted solid produced iron on the gas fired open hearth can be accomplished in toto.

In practice it is hardly possible to so incompletely combust the incoming producer gas or other source of carbonaceous heat as to make the atmosphere in the furnace, and, therefore, the atmosphere impinging on the iron charge, strongly reducing.

In my improved method on top of a moiety of the usual limestone charge, I charge into the furnace a quantity of solid produced iron. This iron is of a character which is directly reduced from ore without being passed through the melting stage in a blast furnace or the like. I preferably employ a charge of solid produced iron which has either been agglomerated or briquetted into relatively dense masses. Preferably, the entire charge for the open hearth furnace is made up of such agglomerated or briquetted solid produced iron. And to protect the charge from the oxidizing heating gases of the furnace, I cover the same with a protective shielding material of granular form such as a mixture of ground limestone, ground basic slag and ground carbon.

Primarily, the shield consists preferably of ground carbon powder thoroughly mixed with finely ground basic slag and it is important to prevent this slag from coalescing too quickly. A shield of powdered carbonaceous material fritted with ground basic slag will exert a converting action on such of the furnace gases as reach the face of the metal whereby the carbon-oxygen contents of such gases are rendered non-oxidizing to the iron, and hence, carburization and lower melting point of the metal become of secondary importance while complete fusion together of the actual particles of melted slag will be so physically retarded that they will not "run away". The admixture of powdered carbonaceous material with the slag will accomplish this in a practical manner.

The tendency of the slag particles to coalesce can still further be retarded by intermixing with them finely ground limestone. The amount of limestone is approximately the same as or less than the remaining moiety that would be normally placed on the bottom of a furnace in the usual pig iron and scrap processes heretofore in general use. Approximately 4/10th of the limestone will volatilize and its carbonic acid product will react with the free carbon in the admixture and thus form an additional protective gaseous layer or blanket of carbon monoxide. Of course, a sufficient amount of carbon must be included in the protective charge to cover this point.

Preferably, the carbonaceous and other shielding materials are in such a physical state that after fritting their mass is as porous as possible. The less compact the nature of this material, the more effective will it be because a greater surface will be presented for acting on the furnace gas. In practice, different carbonaceous materials may be employed depending on circumstances and somewhat on local conditions and the availability of the supply. Charcoal waste is a suitable material for the purpose since it is relatively inexpensive, contains a certain amount of volatile matter, is very light in texture and is remarkably free from sulphur. Ground hard pitch is another suitable material as it contains volatile matter and will swell under the action of hot gases, and hence, would make a good carbon admixture. Similarly, pitch coke or petroleum coke may be utilized as a carbon ingredient. Other eminently suitable carbon carriers are wood, cork-wood and sawdust. Ground bituminous or anthracite coal or ground coke might be used but coke and anthracite coal are not so desirable as the other materials mentioned because of the relatively slower time of reaction and because of some of their other chemical characteristics.

I do not wish to be limited to any particular proportions of materials used in the protective shield but by way of example of what I believe to be a proper charge used for a typical heat, I give the following table:

| | Per cent |
|---|---|
| Ground limestone | 45 |
| Ground basic slag | 25 |
| Ground carbonaceous material | 30 |

It will be understood that the nature of the particular carbonaceous material employed will naturally affect the proportion of amounts of limestone and slag to be used.

Since the carbon will ultimately pass away in a gaseous form and the limestone used takes the place of part of the limestone normally used, therefore, little or no extra slag will be made over that ordinarily used in the manufacture of open hearth steel.

The solid produced iron referred to herein is iron which has been produced directly from the ore by direct reaction with carbonaceous material without being passed through a blast furnace. Such iron is not ordinary sponge iron, it is a relative rigid granular product not spongy. Granular iron in its process of manufacture can be agglomerated from relatively fine granules to larger relatively dense lumps. It can also be briquetted for ease and convenience in handling.

While I have described the method with particularity of detail, it is to be understood that the detail description is to be interpreted in an illustrative rather than a limiting sense since various modifications may be made within the scope of the appended claims.

What I claim is:—

1. The method of making open hearth steel which includes charging a furnace with solid produced iron, covering the charge with a protective shield consisting of ground basic slag, intimately intermixed with ground limestone and carbon powder and melting the charge on the gas, oil or tar fired open hearth.

2. In the manufacture of open hearth steel from solid produced iron, the method which includes the step of protecting the charge from the oxidizing action of the heating gases by covering the charge with a shield comprising an admixture of finely divided slag, finely divided limestone and finely divided carbonaceous material.

3. In the manufacture of steel in an open hearth furnace from an agglomerated charge of solid produced iron, the method which includes the step of protecting the charge from the oxidizing action of the heating gases by covering the charge with a shield comprising an admixture of ground basic slag, ground limestone and ground carbon.

4. The method of making open hearth steel which includes supplying to an open hearth furnace a charge consisting chiefly of dense agglomerated masses or briquettes of solid produced iron, covering such charge with a protective shield comprising an admixture of ground slag, ground limestone and ground carbonaceous material.

5. A new composition of matter adapted to serve as a shield in the manufacture of open hearth steel comprising an admixture of ground basic slag, ground limestone and ground carbonaceous material.

In witness whereof, I have hereunto signed my name.

JOSEPH KENT SMITH